US012204283B2

(12) United States Patent
Morita et al.

(10) Patent No.: US 12,204,283 B2
(45) Date of Patent: Jan. 21, 2025

(54) RECIPROCATING DISPLAY MECHANISM AND TIMEPIECE

(71) Applicant: CITIZEN WATCH CO., LTD., Tokyo (JP)

(72) Inventors: Shoichiro Morita, Saitama (JP); Riko Tsuboi, Tokyo (JP); Daisuke Yamada, Tokyo (JP); Hiroyuki Takahashi, Nagano (JP)

(73) Assignee: Citizen Watch Co., Ltd., Tokyo (JP)

( * ) Notice: Subject to any disclaimer, the term of this patent is extended or adjusted under 35 U.S.C. 154(b) by 599 days.

(21) Appl. No.: 17/445,304

(22) Filed: Aug. 17, 2021

(65) Prior Publication Data

US 2022/0057752 A1 Feb. 24, 2022

(30) Foreign Application Priority Data

Aug. 18, 2020 (JP) ................................. 2020-138004

(51) Int. Cl.

*G04B 19/02* (2006.01)
*G04B 19/04* (2006.01)
*G04C 10/04* (2006.01)

(52) U.S. Cl.

CPC ............. *G04B 19/02* (2013.01); *G04B 19/04* (2013.01); *G04C 10/04* (2013.01)

(58) Field of Classification Search

CPC ........ G04B 19/02; G04B 19/04; G04B 19/24; G04C 10/04; G01D 13/22; G01D 5/145
See application file for complete search history.

(56) References Cited

U.S. PATENT DOCUMENTS

| | | | | |
|---|---|---|---|---|
| 5,608,386 A * | 3/1997 | Murphy, III | G01D 13/26 | 340/688 |
| 2008/0084792 A1* | 4/2008 | Hayashi | G04C 3/14 | 368/80 |
| 2017/0082981 A1* | 3/2017 | Hasegawa | G04C 3/14 | |

FOREIGN PATENT DOCUMENTS

| | | |
|---|---|---|
| JP | 2008-116435 A | 5/2008 |
| JP | 2009-019987 A | 1/2009 |
| JP | 2010-223799 A | 10/2010 |

(Continued)

OTHER PUBLICATIONS

Japanese Office Action mailed on Aug. 29, 2023 for Application No. 2020-138004.

*Primary Examiner* — Edwin A. Leon
*Assistant Examiner* — Kevin Andrew Johnston
(74) *Attorney, Agent, or Firm* — Knobbe, Martens, Olson & Bear, LLP

(57) ABSTRACT

A reciprocating display mechanism performing predetermined display by reciprocating a hand within a fixed area includes a hand capable of reciprocating within the fixed area, a hand driving wheel that drives the hand and includes a wheel, a transmission wheel that rotates the hand driving wheel by engaging with a tooth of the wheel, and a biasing member that biases the hand in one direction of the reciprocating, wherein the wheel includes an angle area corresponding to the fixed area and a region adjacent to the angle area, the angle area provided with teeth and a part of the region adjacent to the angle area provided with an idle region in which the transmission wheel idles, and the one direction biasing by the biasing member is a direction in which the tooth adjacent to the idle region engages with the transmission wheel when the idle region faces the transmission wheel.

9 Claims, 7 Drawing Sheets

(56) References Cited

FOREIGN PATENT DOCUMENTS

| | | | | | |
|---|---|---|---|---|---|
| WO | WO-2006052012 | A2 * | 5/2006 | ........... | G04B 19/082 |
| WO | 2006-108878 | A1 | 10/2006 | | |
| WO | WO-2019123821 | A1 * | 6/2019 | ............. | F16H 55/18 |

* cited by examiner

RECIPROCATING DISPLAY MECHANISM AND TIMEPIECE

CROSS-REFERENCE TO RELATED APPLICATION

The present application is based on and claims priority from Japanese patent application No. 2020-138004 filed on Aug. 18, 2020, the disclosure of which is hereby incorporated by reference in its entirety.

FIELD OF THE INVENTION

A present disclosure relates to a reciprocating display mechanism and a timepiece.

BACKGROUND

A timepiece including a reciprocating display mechanism is known. The reciprocating display mechanism is configured to reciprocate a hand in the normal rotation direction and the reverse rotation direction within a fixed fan-shaped area of a dial plate of a timepiece, and to display a predetermined physical quantity. The physical quantity that is displayed by the reciprocating display mechanism includes power reserve of a battery and a spring which are power sources for driving a timepiece.

A hand that displays a time generally rotates, and such a rotating hand is fixed to a hand driving wheel including a wheel having teeth on the entire circumference thereof. The teeth of the wheel engage with a pinion provided in another rotating wheel, so that the rotation is transmitted.

On the other hand, in a timepiece in which a moving area of a hand is limited to a fan-shaped area, teeth provided in a wheel itself to which the hand is fixed and another wheel engaging with the wheel to which the hand is fixed are provided not in the entire circumference thereof but only in a rotation angle area corresponding to the fan-shaped area, as taught in JP2008-116435A, for example.

Moreover, in a timepiece having another configuration, teeth are provided in an entire circumference of a wheel to which a hand is fixed, a circular arc shaped opening portion is provided in a rotation angle area of the wheel to which the hand is fixed, which corresponds to a fan-shaped area, an unrotatable stopper is inserted into the opening portion, and the stopper contacts an end edge of the opening portion when the wheel to which the hand is fixed rotates, so that the rotation area of the wheel to which the hand is fixed is limited to the fan-shape area, as taught in JP2010-223799A.

With the techniques disclosed in the above JP2008-116435A and JP2010-223799A, the wheel to which the hand is fixed contacts another member, so as to limit the moving area of the hand within the fan-shaped area.

When a driving wheel that drives the wheel to which the hand is fixed with a stepping motor, it is necessary to switch the rotation direction of the stepping motor from the normal rotation direction to the reverse rotation direction and to switch from the reverse rotation direction to the normal rotation direction, so as to reciprocate the hand within the fan-shaped area.

When rotating in the reverse rotation direction from the stationary state, it is necessary for the rotor of the stepping motor to slightly rotate in the normal rotation direction temporarily from the stationary state, and then to rotate in the reverse rotation direction by passing through the original stationary position with a reverse rotation force which returns to the original stationary position from the state slightly rotated in the normal rotation direction.

Accordingly, in the stationary state in which the wheel contacts another member in one end of the fan-shaped area, it is not possible to slightly rotate in the normal rotation direction for rotating in the reverse rotation direction from that position.

Herein, with the technique disclosed in JP2010-223799A, a wheel, which becomes immobilized when an interlocking member disposed inside a timepiece interlocking with an external operation member contacts another member by operating the external operation member, slightly rotates in the normal rotation direction, so that the rotor of the stepping motor rotates in the reverse rotation direction.

However, when such an external operation member is additionally provided, it is necessary to have a space inside the timepiece. Such a space increases the size of the timepiece and such an external operation member increases costs due to an increase in the number of components.

Therefore, the present disclosure has been made in view of the above circumstances, and an object of the present disclosure is to provide a reciprocating display mechanism capable of reciprocating a hand within a fixed area without providing an external operation member, and a timepiece having such a reciprocating display mechanism.

SUMMARY

A first aspect of the present disclosure provides a reciprocating display mechanism that performs predetermined display by reciprocating a hand within a fixed area, the reciprocating display mechanism including a hand capable of reciprocating within the fixed area, a hand driving wheel that drives the hand and includes a wheel, a transmission wheel that rotates the hand driving wheel by engaging with a tooth of the wheel, and a biasing member that biases the hand in one direction of the reciprocating. The wheel includes an angle area corresponding to the fixed area and a region adjacent to the angle area, the angle area being provided with teeth and a part of the region adjacent to the angle area being provided with an idle region in which the transmission wheel idles, and the one direction that biases by the biasing member is a direction in which the tooth adjacent to the idle region engages with the transmission wheel when the idle region faces the transmission wheel.

A second aspect of the present disclosure provides a timepiece including the reciprocating display mechanism according to the present disclosure and a stepping motor that rotates the driving wheel. The one direction is set in a direction corresponding to rotation in a direction opposite to a normal rotation direction of a rotor of the stepping motor.

DETAILED DESCRIPTION

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

Hereinafter, an embodiment of a reciprocating display mechanism and a timepiece including the reciprocating display mechanism according to the present disclosure will be described with reference to the accompanying drawings.

Figure 1:
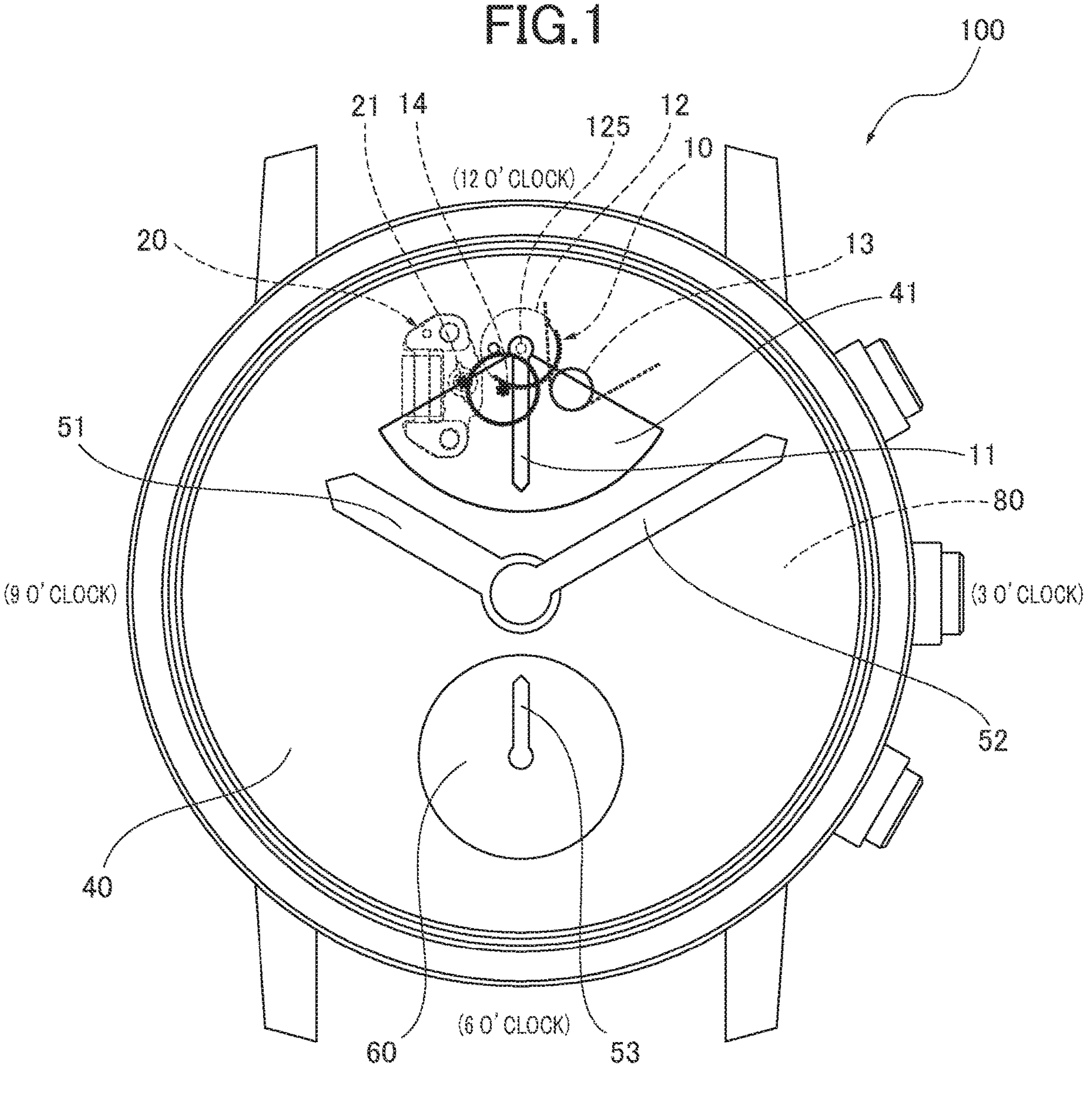
FIG. 1 is a plan view illustrating a timepiece including a fan-shaped display mechanism which is an embodiment of a reciprocating display mechanism according to the present disclosure.
Figure 2:
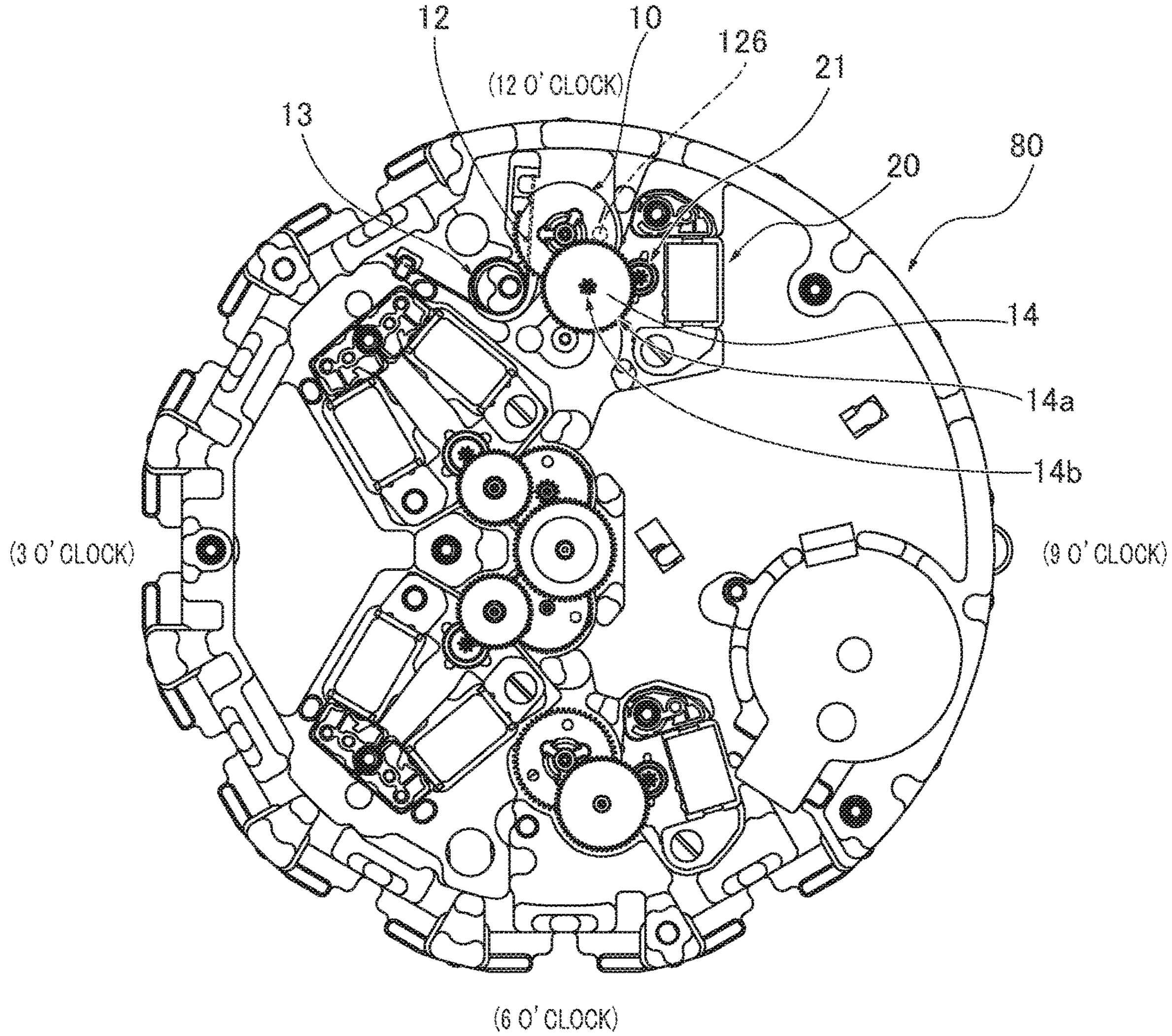
FIG. 2 is a view illustrating a movement of the timepiece, as seen from a back cover side of the timepiece, including the fan-shaped display mechanism.
Figure 3:
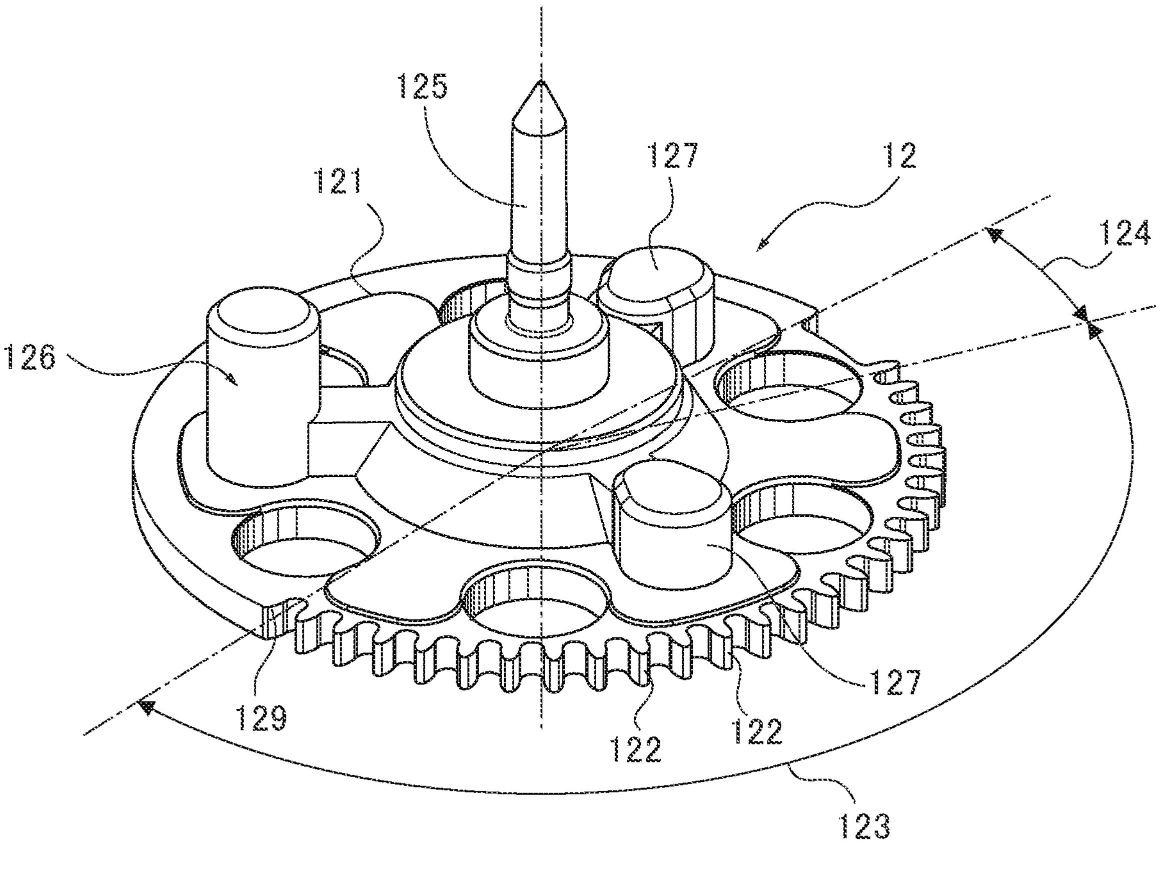
FIG. 3 is a perspective view of a hand driving wheel, as seen from a dial plate side of the timepiece, in the fan-shaped display mechanism illustrated in FIG. 1.

A configuration will be described. FIG. 1 is a plan view illustrating a timepiece 100 including a fan-shaped display mechanism 10 as an embodiment of a reciprocating display mechanism according to the present disclosure. FIG. 2 is view illustrating a movement of the timepiece 100, as seen from a back cover side of the timepiece, including the fan-shaped display mechanism 10 illustrated in FIG. 1. FIG. 3 is a perspective view of a hand driving wheel 12, as seen from a dial plate 40 side of the timepiece 100, in the fan-shaped display mechanism 10 illustrated in FIG. 1. Note that the timepiece 100 is also an embodiment of the timepiece according to the present disclosure.

The illustrated timepiece 100 includes an hour hand 51 and a minute hand 52. The timepiece 100 displays a time with the hour hand 51 and the minute hand 52 that indicate hour marks such as numbers and index bars displayed on the dial plate 40. In FIG. 1, the hour marks are omitted.

The dial plate 40 includes in a region thereof in the six o'clock direction (lower region of dial plate 40) a small hand region 60. A second hand 53 is provided in the small hand region 60.

The dial plate 40 includes in a region thereof in the twelve o'clock direction the fan-shaped display mechanism 10. The dial plate 40 includes in the twelve o'clock region thereof (upper region of dial 40 plate) a fan-shaped display region 41 having a fan-shaped contour with about 120 degrees of the center angle. The fan-shaped display region 41 has a circular arc of the fan toward the center of the dial plate 40 and a pivot of the fan toward the twelve o'clock region.

Not shown scales are provided on the fan-shaped display region 41. The scales are provided at predetermined intervals (may be equal angle intervals as example) in a circumference direction with the pivot of the fan as a center. The scales show a variable physical quantity such as power reserve of a battery that is a driving source for driving the timepiece 100, for example.

The fan-shaped display mechanism 10 reciprocates an after-described hand 11 in a circular arc shape within in a fixed area including the fan-shaped display region 41 to perform predetermined display. In this embodiment, the hand 11 indicates the scale displayed on the fan-shaped display region 41 in the fixed area within which the hand 11 reciprocates, so as to inform a user of the timepiece 100 of the power reserve of the battery.

As described above, the hand 11 moves in an area having an angle area wider than that of the fan-shaped display region 41 on which the scales are displayed. However, the area that recognizably displays the power reserve of the battery is only the area of the fan-shaped display region 41 on which the scales are displayed.

The fan-shaped display mechanism 10 includes the hand 11, a hand driving wheel 12, an intermediate wheel 14 (example of transmission wheel), and a kick spring (torsion coil spring) 13 (example of biasing member).

The hand driving wheel 12 includes a wheel 121 and a shaft 125 that are integrated, as illustrated in FIG. 3. The hand 11 is fixed to the shaft 125, and the hand 11 and the hand driving wheel 12 integrally rotate about the shaft 125.

The wheel 121 includes an angle area 123 (angle area of 164 degrees as example) about half of one round. The teeth 122 are provided only in the angle area 123. That is, the teeth 122 are not provided in the entire circumference of the wheel 121 about the shaft 125. The teeth 122 engage with a pinion **14*b* (refer to FIGS. 4 to 9) of the intermediate wheel 14**.

The wheel 121 includes a region adjacent to the angle area 123 provided with the teeth 122. An idle region 124 in which the pinion **14*b* of the intermediate wheel 14 engaging with the teeth 122 idles is provided in one part of the region adjacent to the angle area 123 provided with the teeth 122. The idle region 124 has a radius or less corresponding to the radius at the bottom of the tooth 122 provided in the wheel 121, so that the pinion 14*b* idles. The idle region 124 has a length of one module or more over a pitch circle (reference circle) of the wheel 121**.

A stopper 129 is provided in the other part of the region adjacent to the angle area 123 provided with the teeth 122, which is opposite to the idle region 124. A tooth of the pinion **14*b* that rotates by engaging with the teeth 122 contacts the stopper 129, so that the stopper 129 stops the rotation of the intermediate wheel 14**.

The stopper 129 in this embodiment has a radius corresponding to the radius at the addendum of the tooth 122, but the radius of the stopper 129 is not limited thereto. The stopper 129 may have a radius larger or smaller than the radius at the addendum of the tooth 122 as long as it stops the rotation of the pinion **14*b* when the tooth of the pinion 14*b* contacts the stopper 129**.

The wheel 121 includes, on one surface thereof (for example, surface toward dial plate 40), a cylindrical projection 126 projecting in the direction of the shaft 125. The projection 126 has a circumference surface that contacts an arm portion 13*a* of the after described kick spring 13, and the projection 126 presses the arm portion 13*a* according to the rotation of the wheel 121 to elastically deform a coil portion of the kick spring 13 to be twisted.

The wheel 121 also includes, on the same surface on which the projection 126 is provided, two substantially cylindrical projections 127 similar to the projection 126. Different from the projection 126, the projections 127 do not impact on another member, and are provided to keep a weight balance with the projection 126.

It is thus preferable for the three projections 126, 127, 127 to have a similar mass, and to be disposed at substantially equal angle intervals about the shaft 125. The number of the projections 127 is not limited to two. For example, three or more projections or a single projection may be provided. When the weight balance is not considered, the projection 127 may be omitted.

The intermediate wheel 14 includes a wheel 14*a* and the pinion 14*b* which are coaxially and integrally provided. The pinion 14*b* has the number of teeth less than that of the wheel 14*a*. The wheel 14*a* engages with a not shown wheel fixed coaxially to a rotor 21 of a stepping motor 20. The pinion 14*b* engages with the teeth 122 of the wheel 121 of the hand driving wheel 12. The rotation of the rotor 21 of the stepping motor 20 is thereby transmitted to the hand driving wheel 12 through the intermediate wheel 14.

The kick spring 13 presses (biases) the wheel 121, that is driven in the clockwise direction, in the counterclockwise direction.

FIGS. 4 to 9 are plan views describing the engagement state of the pinion 14*b* and the angle area 123 provided with the teeth 122 of the wheel 121 of the hand driving wheel 12 and the positional relationship between the fan-shaped display region 41 and the hand 11.

As illustrated in FIGS. 4 to 9, the stepping motor 20 is set such that the rotation of the rotor 21 in the normal rotation direction becomes the rotation in the clockwise direction as seen from the dial plate 40 side. Accordingly, the intermediate wheel 14 rotates in the counterclockwise direction by the rotation of the rotor 21 in the normal rotation direction, and the hand driving wheel 12 rotates in the clockwise direction. That is, the rotation direction of the intermediate wheel 14 when the engagement with the intermediate wheel 14 as the transmission wheel advances toward the idle region 124 from the area provided with the teeth 122 of the wheel 121 is set according to the normal rotation direction of the stepping motor 20 that rotates the intermediate wheel 14.

The intermediate wheel 14 rotates in the clockwise direction and the hand driving wheel 12 rotates in the counterclockwise direction by the rotation of the rotor 21 in the reverse rotation direction (rotation in counterclockwise direction as seen from dial plate 40 side).

Next, the relationship between the angle area 123 (see FIG. 3) provided with the teeth 122 of the wheel 121 of the hand driving wheel 12 and the position of the hand 11 will be described.

Figure 4:
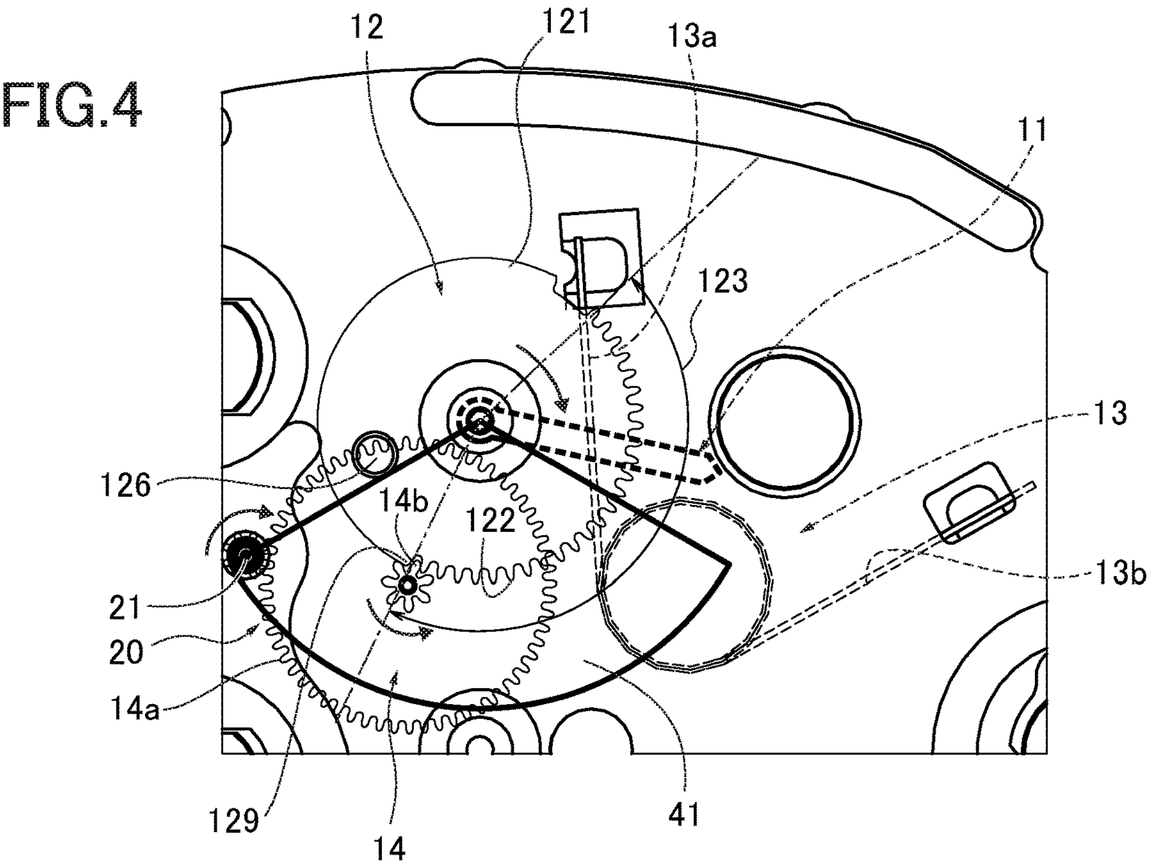
FIG. 4 is a plan view (part 1) describing an engagement state of a pinion and an angle area provided with teeth of a wheel of the hand driving wheel and a positional relationship between the fan-shaped display range and the hand.

FIG. 4 shows that the hand driving wheel 12 rotates such that the pinion 14*b* engages with the leading end tooth 122 of the angle area 123 provided with the teeth 122 in the clockwise direction (rear end tooth in counterclockwise direction), and the pinion 14*b* contacts the stopper 129 adjacent to the angle area 123 provided with the teeth 122, so that the wheel 121 stops rotating in the counterclockwise direction.

Although the teeth 122 of the wheel 121 rotate when the pinion 14*b* of the intermediate wheel 14 engages with the teeth 122, the pinion 14*b* is inhibited from rotating in the clockwise direction, and stops when the pinion 14*b* contacts the stopper 129.

In this state, the rotor 21 rotates in the reverse rotation direction (counterclockwise direction), the intermediate wheel 14 engaging with the wheel coaxial with the rotor 21 rotates in the clockwise direction, and the pinion 14*b* contacts the stopper 129 to be inhibited from rotating in the clockwise direction. The hand driving wheel 12 is also inhibited from rotating in the counterclockwise direction, and stops.

Accordingly, in the state illustrated in FIG. 4, the hand 11 fixed to the hand driving wheel 12 locates in the leading end edge of the rotatable area in the counterclockwise direction (rear end edge in clockwise direction). In addition, in this position, the hand 11 dislocates from the fan-shaped display region 41 in the counterclockwise direction.

In the state illustrated in FIG. 4, although the rotor 21 cannot further rotate in the reverse rotation direction from the stopped state, the stepping motor 20 can rotate the rotor 21 by switching the rotation direction of the rotor 21 into the normal rotation direction (clockwise direction) without slightly rotating the rotor 21 in the reverse rotation direction.

In FIGS. 5 to 9, with the position of the projection 126 of the hand driving wheel 12 in the state illustrated in FIG. 4 as a reference position, the projection 126 in this reference position is shown by a two-dot chain line of a virtual line.

Figure 5:
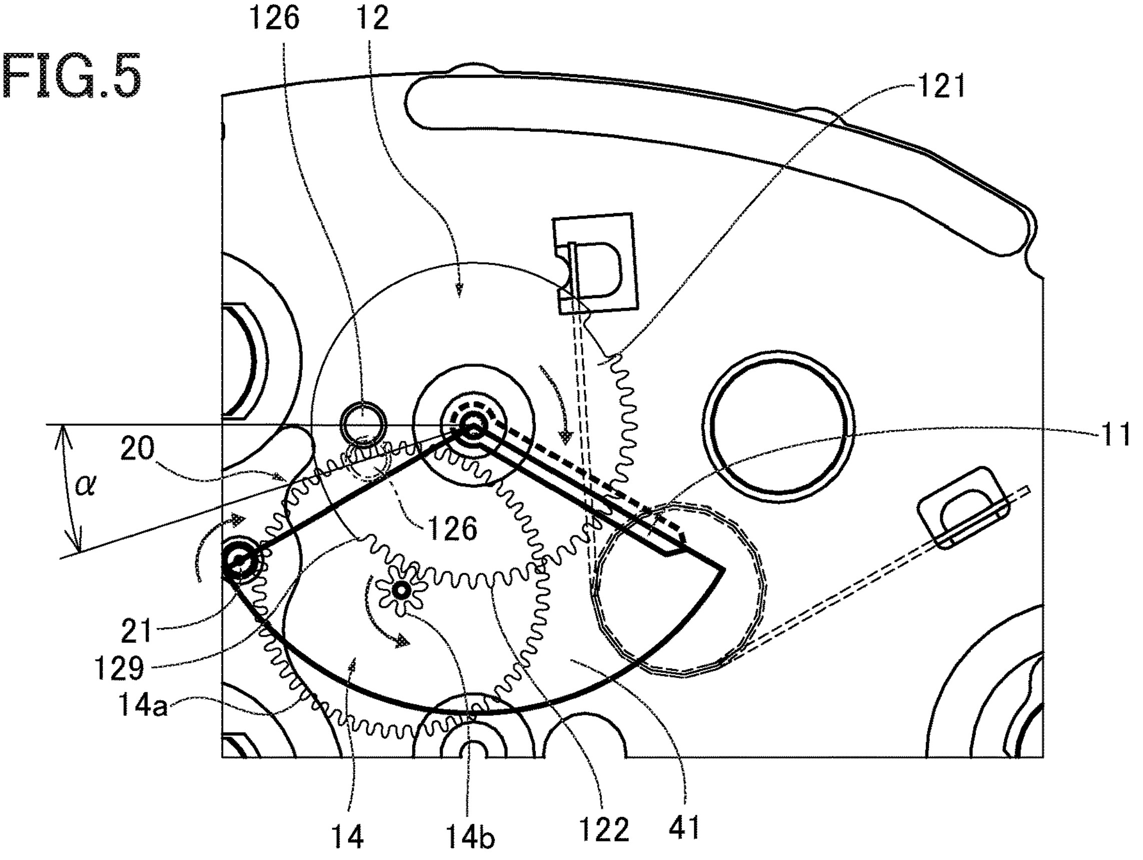
FIG. 5 is a plan view (part 2) describing an engagement state of the pinion and the angle area provided with the teeth of the wheel of the hand driving wheel and a positional relationship between the fan-shaped display range and the hand.

FIG. 5 shows that the pinion 14*b* rotates in the clockwise direction from the reference position (state in FIG. 4) in which the pinion 14*b* contacts the stopper 129, and the hand 11 is aligned with the leading end edge of the fan-shaped display region 41 in the counterclockwise direction (rear end edge in clockwise direction).

In this case, the wheel 121 rotates at an angle of α degree in the clockwise direction from the position of the projection 126 in the reference position illustrated in FIG. 4 to the position in which the hand 11 is aligned with the leading end edge of the fan-shaped display region 41 illustrated in FIG. 5.

FIG. 5 shows that the pinion 14*b* engages with the tooth 122 in the angle area 123 provided with the teeth 122, and is rotatable both in the clockwise direction and the counterclockwise direction. The state illustrated in FIG. 5 is reached from the reference position illustrated in FIG. 4 by inputting a previously set predetermined number of driving signals (for example, step signal) into the stepping motor 20.

Herein, it is desirable for the angle α to be four steps or more in terms of the variations in the reference position illustrated in FIG. 4 (variation in stable stop position of rotor 21) and a hand movement operation to remove backlash for preventing the displacement between the stop position of the hand 11 after the normal rotation by the backlash and the stop position of the hand 11 after the reverse rotation by the backlash (hand movement operation which stops by normal rotation of two steps after reverse rotation of 12 steps when reverse rotation of 10 steps is set to target stop position, for example).

In addition, for example, it is preferable for the driving signal to be set to 12 degrees (=four steps) or more when the hand 11 moves by three degrees per one step.

Figure 6:
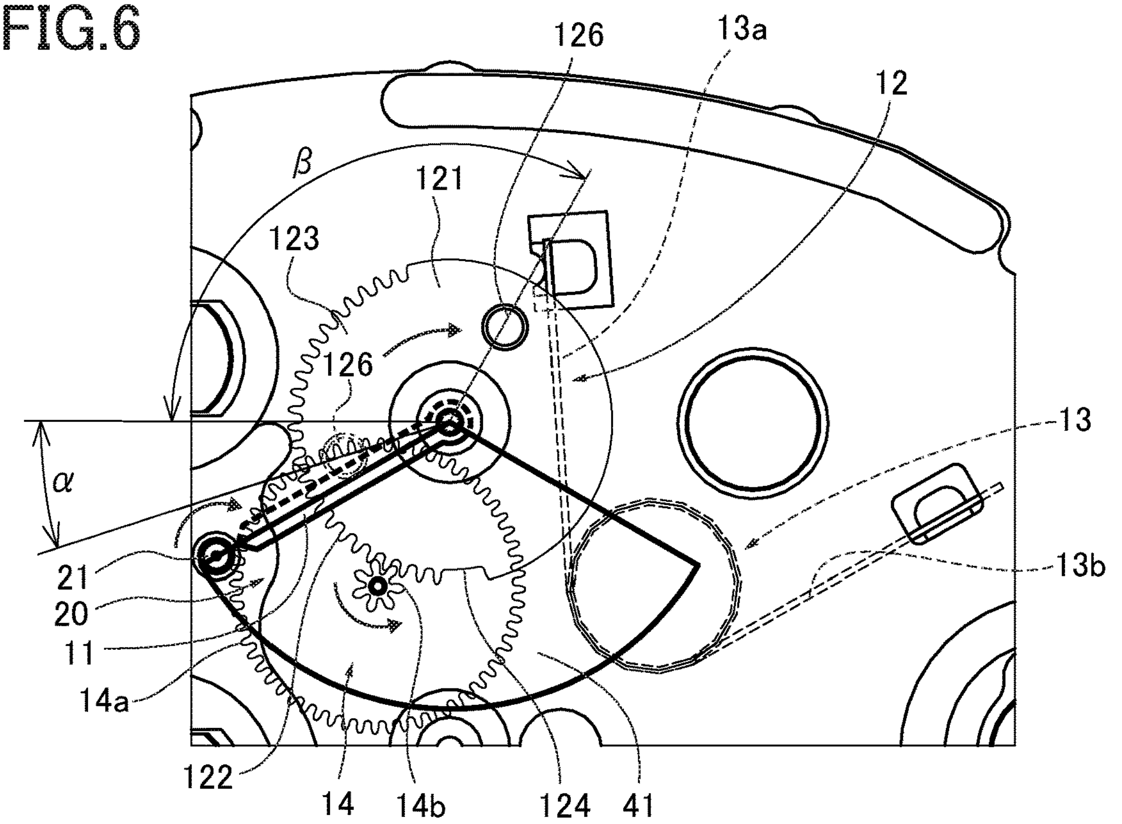
FIG. 6 is a plan view (part 3) describing an engagement state of the pinion and the angle area provided with the teeth of the wheel of the hand driving wheel and a positional relationship between the fan-shaped display range and the hand.

FIG. 6 shows that the wheel 121 rotates in the clockwork direction from the state illustrated in FIG. 5, and the hand 11 is aligned with the leading end edge of the fan-shaped display region 41 in the clockwise direction (rear end edge in counterclockwise direction).

When the angle from the leading end edge to the rear end edge of the fan-shaped display region 41 in the clockwise direction is set to β degree, the wheel 121 rotates at the angle of β degree in the clockwise direction from the position of the projection 126 illustrated in FIG. 5 to the position of the projection 126 illustrated in FIG. 6. In addition, the angle β may be 120 degrees as an example, but it is not limited to 120 degrees.

By inputting a predetermined number of driving signals corresponding to the rotation angle of β degree of the hand driving wheel 12 into the stepping motor 20, the hand 11 reaches the position in which the hand 11 is aligned with the leading end edge of the fan-shaped display region 41 in the clockwise direction as illustrated in FIG. 6 from the position in which the hand 11 is aligned with the rear end edge of the fan-shaped display region 41 in the clockwise direction as illustrated in FIG. 5.

FIG. 6 shows that the pinion 14*b* engages with the tooth 122 in the angle area 123 provided with the teeth 122, and is rotatable both in the clockwise direction and the counterclockwise direction.

Between the state illustrated in FIG. 5 and the state illustrated in FIG. 6, the hand 11 can reciprocate in the area of the fan-shaped display region 41 according to the rotation of the hand driving wheel 12, and the hand 11 can perform predetermined display by indicating a scale displayed on the fan-shaped display region 41.

Figure 7:
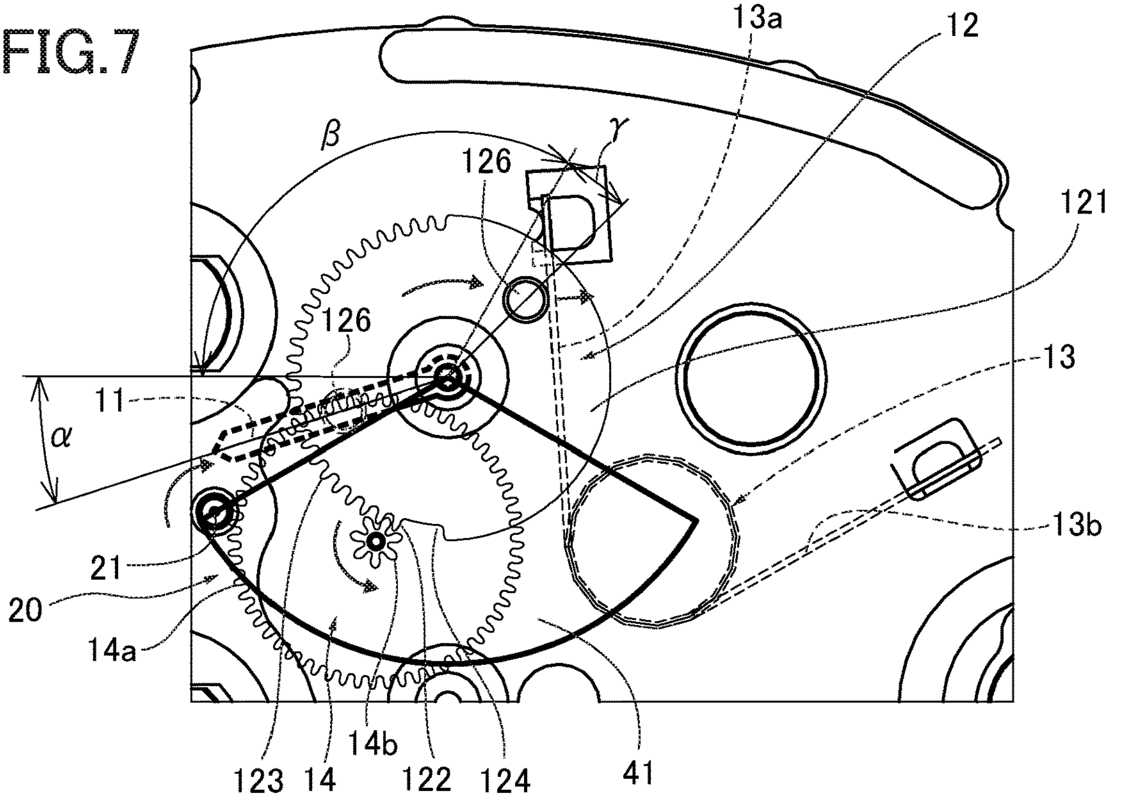
FIG. 7 is a plan view (part 4) describing an engagement state of the pinion and the angle area provided with the teeth of the wheel of the hand driving wheel and a positional relationship between the fan-shaped display range and the hand.

FIG. 7 shows that the hand driving wheel 12 rotates at an angle of γ degree in the clockwise direction from the state illustrated in FIG. 6 such that the pinion 14*b* engages with the rear end tooth 122 of the angle area 123 provided with the teeth 122 in the clockwise direction (leading end tooth in counterclockwise direction). FIG. 7 shows that the projection 126 of the wheel 121 starts contacting the arm portion 13*a* of the kick spring 13 fixed to the movement.

By inputting a predetermined number of driving signals corresponding to the rotation angle of γ degree of the hand driving wheel 12 into the stepping motor 20, the projection 126 of the wheel 121 reaches the position illustrated in FIG. 7 from the position illustrated in FIG. 6. It is desirable for the number of the steps of the driving signal to be one step or more such that the wheel 121 receives a pressing force by the kick spring 13 and the stop position of the hand 11 is not affected by the backlash when the hand 11 locates within the fan-shaped display region 41, due to the variations in the projection 126 and the kick spring 13.

In addition, it is preferable for the driving signal to be set to three degrees (=one step) or more when the hand 11 moves by three degrees per one step.

The wheel 121 includes the angle area 123 provided with the teeth 122 and the region adjacent to the angle area 123. A part of the region adjacent to the angle area 123, which is adjacent to the rear end tooth 122 in the clockwise direction (leading end tooth in counterclockwise direction), is provided with the idle region 124. Accordingly, the pinion 14*b* can further rotate in the counterclockwise direction from the state illustrated in FIG. 7. In the state illustrated in FIG. 7, the hand 11 dislocates from the fan-shaped display region 41 in the clockwise direction.

Figure 8:
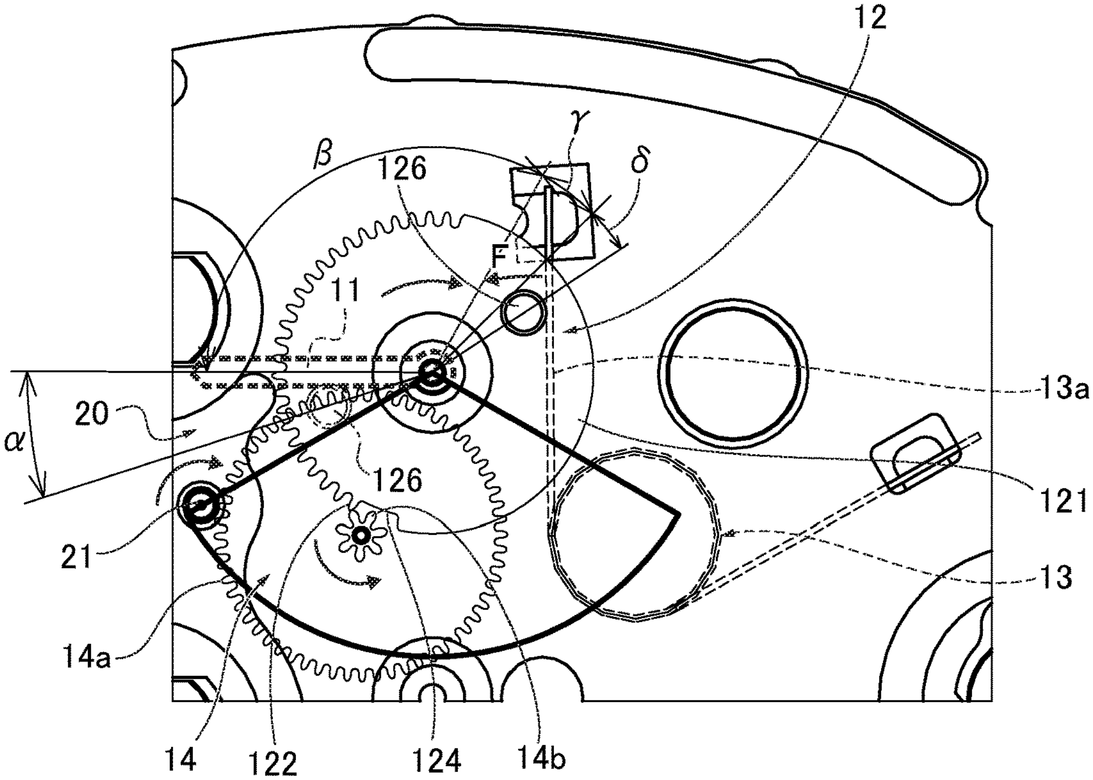
FIG. 8 is a plan view (part 5) describing an engagement state of the pinion and the angle area provided with the teeth of the wheel of the hand driving wheel and a positional relationship between the fan-shaped display range and the hand.

FIG. 8 shows that all of the teeth 122 of the angle area 123 are fed in the clockwise direction by the rotation of the pinion 14*b* to be located beyond the pinion 14*b* in the clockwise direction, and the hand driving wheel 12 rotates at an angle of δ degree in the clockwise direction from the state illustrated in FIG. 7.

In the state illustrated in FIG. 8, the pinion 14*b* feeds all of the teeth 122 in the clockwise direction, and the pinion 14*b* locates in the idle region 124. In the idle region 124, although the tooth 122 contacts the pinion 14*b*, the wheel 121 idles without rotating even when the pinion 14*b* rotates in the counterclockwise direction.

The rotation of the pinion 14*b* in the counterclockwise direction corresponds to the rotation of the rotor 21 of the stepping motor 20 in the normal rotation direction (clockwise direction). Accordingly, by the idle of the pinion 14*b* in the counterclockwise direction, the rotor 21 is rotatable without being inhibited from rotating in the normal rotation direction.

By the control of the controller, when a predetermined number of driving signals is input into the stepping motor 20 to locate the idle region 124 to the pinion 14*b*, the rotation of the rotor 21 in the normal rotation direction stops.

In the state illustrated in FIG. 8, as the intermediate wheel 14 does not further rotate the hand driving wheel 12 in the clockwise direction, the hand 11 fixed to the hand driving wheel 12 locates in the leading end edge of the rotatable area in the clockwise direction (rear end edge in the counterclockwise direction).

Moreover, in the state illustrated in FIG. 8, as the wheel 121 rotates at the angle of δ degrees in the clockwise direction from the state illustrated in FIG. 7, the projection 126 of the wheel 121 presses one of the arm portions 13*a* of the kick spring 13 in the clockwise direction. The kick spring 13 thereby elastically deforms to narrow the angle interval between the two arm portions 13*a*, 13*b*.

As a result, the kick spring 13 presses the wheel 121 in the counterclockwise direction by pressing (biasing) the projection 126 provided in the wheel 121 in the left direction of the figure with the reaction force according to the elastic deformation. In the state illustrated in FIG. 8, the wheel 121 rotates in the counterclockwise direction by the torque in the counterclockwise direction received from the kick spring 13, and the teeth 122 of the wheel 121 press the pinion 14*b*.

Figure 9:
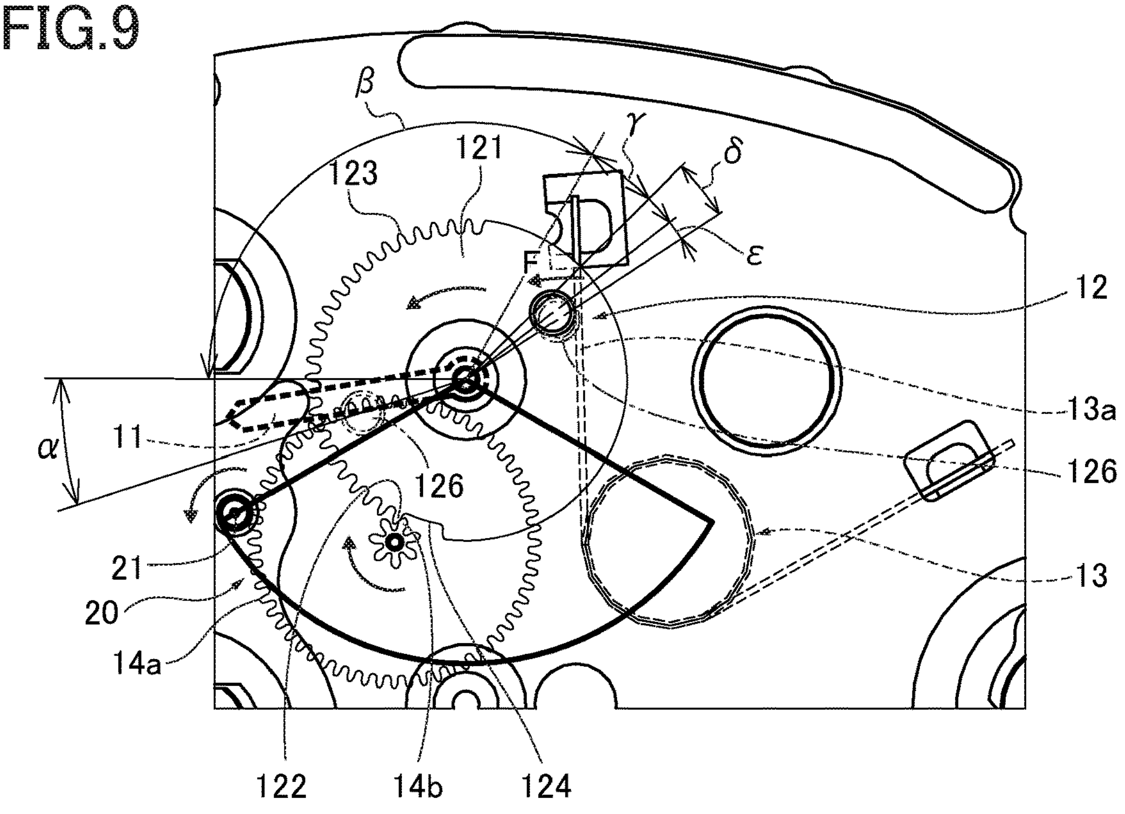
FIG. 9 is a plan view (part 6) describing an engagement state of the pinion and the angle area provided with the teeth of the wheel of the hand driving wheel and a positional relationship between the fan-shaped display range and the hand.

FIG. 9 shows that the wheel 121 slightly rotates in the counterclockwise direction by the torque in the counterclockwise direction received from the kick spring 13, so that the tooth 122 of the wheel 121 engages with the pinion 14*b* to be stopped.

As the rotation of the rotor 21 stops, the pinion 14*b* rotates in the clockwise direction by being pressed in the clockwise direction from the teeth 122 with the torque of the kick spring 13. However, by the balancing between the retaining torque (cogging torque) which maintains the stop state of the rotor 21 coupled to the pinion 14*b* and the torque by the elastic force of the kick spring 13, as illustrated in FIG. 9, the pinion 14*b* stops when the projection 126 returns in the counterclockwise direction at an angle of ε degree from the position of the projection 126 (illustrated by two-dot chain line) in FIG. 8.

In order to definitely move the wheel 121 from the position illustrated in FIG. 8 to the position illustrated in FIG. 7, in view of variations in components, it is preferable to set the specifications of the kick spring 13 and the hand driving wheel 12 such that the angle ε becomes smaller than the angle δ (ε<δ).

In the stopped state illustrated in FIG. 9, the tooth 122 contacts the pinion 14*b* and the projection 126 contacts the arm portion 13*a* of the kick spring 13. However, in the states illustrated in FIGS. 4 to 6, the projection 126 does not contact the kick spring 13. Accordingly, in the states illustrated in FIGS. 4 to 6, the torque in the counterclockwise direction by the kick spring 13 is not applied to the wheel 121.

The operation of the fan-shaped display mechanism 10 and the timepiece 100 of the embodiment configured as described above will be described. More specifically, it will be described when a predetermined physical amount in the operation of the timepiece 100 is displayed on the fan-shaped display region 41 by the hand 11.

In the timepiece 100, by the operation of the controller of the timepiece 100, the rotor 21 of the stepping motor 20 rotates in the counterclockwise direction, the wheel 14*a* of the intermediate wheel 14 that engages with the wheel coaxial with the rotor 21 rotates in the clockwise direction, and the hand driving wheel 12 whose teeth 122 engage with the pinion 14*b* of the intermediate wheel 14 rotates in the counterclockwise direction.

The pinion 14*b* engages with the tooth 122 provided in the angle area 123 to rotate the hand driving wheel 12 in the counterclockwise direction. However, as illustrated in FIG. 4, when the pinion 14*b* contacts the stopper 129 adjacent to the angle area 123 provided with the teeth 122, the rotation of the pinion 14*b* in the clockwise direction stops, and the pinion 14*b* cannot further rotate the hand driving wheel 12 in the counterclockwise direction, so that the rotation of the hand driving wheel 12 stops. In this case, the rotation of the rotor 21 of the stepping motor 20 in the counterclockwise direction stops.

With the stopped position of the hand driving wheel 12 as the reference position (refer to FIG. 4), a preset predetermined number of driving signals is input into the stepping motor 20 by the control of the controller to rotate the rotor 21 in the clockwise direction from the reference position, and to move the hand 11 in a position which is aligned with the rear end edge of the fan-shaped display region 41 in the clockwise direction (refer to FIG. 5).

For example, it is preferable for the driving signal to be set to 12 degrees (=four steps) or more when the hand 11 moves three degrees per one step.

Herein, the rotation of the rotor 21 of the stepping motor 20 is switched to the rotation in the clockwise direction (normal rotation direction) from the reference position in which the rotation in the counterclockwise direction (reverse rotation direction) is stopped. However, when switching from the reverse rotation direction to the normal rotation direction, it is not necessary for the stepping motor 20 to slightly rotate in the reverse rotation direction prior to the rotation in the normal rotation direction.

Next, in order to move the hand 11 (FIG. 5) in the position that is aligned with the rear end edge of the fan-shaped display region 41 in the clockwise direction to the position of a predetermined scale of the fan-shaped display region 41 corresponding to the physical amount to be displayed, the number of driving signals corresponding to the rotation angle of the hand driving wheel 12 to the position of the scale is input into the stepping motor 20 by the control of the controller.

The hand 11 thereby rotates in the clockwise direction from the position that is aligned with the rear end edge of the fan-shaped display region 41 in the clockwise direction, and stops in a position indicating a predetermined scale of the fan-shaped display region 41, so that a predetermined physical amount is displayed by the scale indicated by the hand 11.

In order to further rotate the hand 11 in the clockwise direction from this state, when the driving signal for normally rotating the rotor 21 is input into the stepping motor 20, the hand driving wheel 12 rotates in the clockwise direction to the position in which the idle region 124 corresponds to the pinion 14*b*, as illustrated in FIG. 8, through the state illustrated in FIG. 6 and the state illustrated in FIG. 7 in this order.

When the hand driving wheel 12 rotates to the position in which the idle region 124 corresponds to the pinion 14*b*, the pinion 14*b* idles. The rotation of the rotor 21 in the normal rotation direction stops by the control of the controller when a predetermined number of driving signals is input into the stepping motor 20.

In this case, as the hand driving wheel 12 does not further rotate in the clockwise direction, the hand 11 locates in the leading end of the rotatable area in the clockwise direction.

As the projection 126 provided in the wheel 121 of the hand driving wheel 12 receives the reaction force of the kick spring 13 elastically deformed by pressing the arm portion 13*a* from the state illustrated in FIG. 7, the hand driving wheel 12 goes back in the counterclockwise direction to the position illustrated in FIG. 9 from the state illustrated in FIG. 8, and stops.

In the state illustrated in FIG. 9, the pinion 14*b* stops while the pinion 14*b* engages with the tooth 122. However, when the rotor 21 rotates in the clockwise direction, and stops, it is necessary to rotate once the rotor 21 in the normal rotation direction prior to the rotation in the counterclockwise direction, in order to rotate the rotor 21 in the counterclockwise direction next.

In the fan-shaped display mechanism 10 of the present embodiment, as the pinion 14*b* locates in the idle region 124 of the wheel 121 when the rotor 21 rotates in the clockwise direction, and stops, the pinion 14*b* can idle in the reverse rotation direction.

Accordingly, when the hand 11 rotates in the counterclockwise direction to return to the reference position, the rotor 21 once slightly rotates in the normal rotation direction, and then the rotor 21 can rotate in the counterclockwise direction with the reaction force that returns to the stopped position from the normal rotation direction.

The hand 11 stopped at the leading end edge (rotation of rotor 21 in normal rotation direction) of the rotatable area in the clockwise direction thereby directly rotates in the counterclockwise direction to indicate the scale provided in the fan-shaped display region 41, so that the hand 11 that rotates in the counterclockwise direction can also display a predetermined physical amount.

The biasing direction of the kick spring 13 is a direction in which the tooth 122 adjacent to the idle region 124 engages with the pinion 14*b* when the idle region 124 faces the pinion 14*b* of the intermediate wheel 14.

As described above, according to the fan-shaped display mechanism 10 and the timepiece 100 including the fan-shaped display mechanism 10 of the present embodiment, the hand 11 can reciprocate within a fixed area without providing an external operation member that is operated from an exterior.

The hand driving wheel 12 in the fan-shaped display mechanism 10 of the present embodiment includes the stopper 129 that prevents mechanical rotation in the counterclockwise direction at a predetermined angle or more. The positional relationship between the hand 11 attached to the wheel 121 and the position of the scale of the fan-shaped display region 41 can be thereby set with the position in which the pinion 14*b* contacts the stopper 129 to be mechanically stopped as the reference position.

Modified Example

In the fan-shaped display mechanism 10 and the timepiece 100 of the above-described embodiment, the hand driving wheel 12 and the kick spring 13 as an example of the biasing member are separated. However, the hand driving wheel 12 and the biasing member may be integrated.

Figure 10:
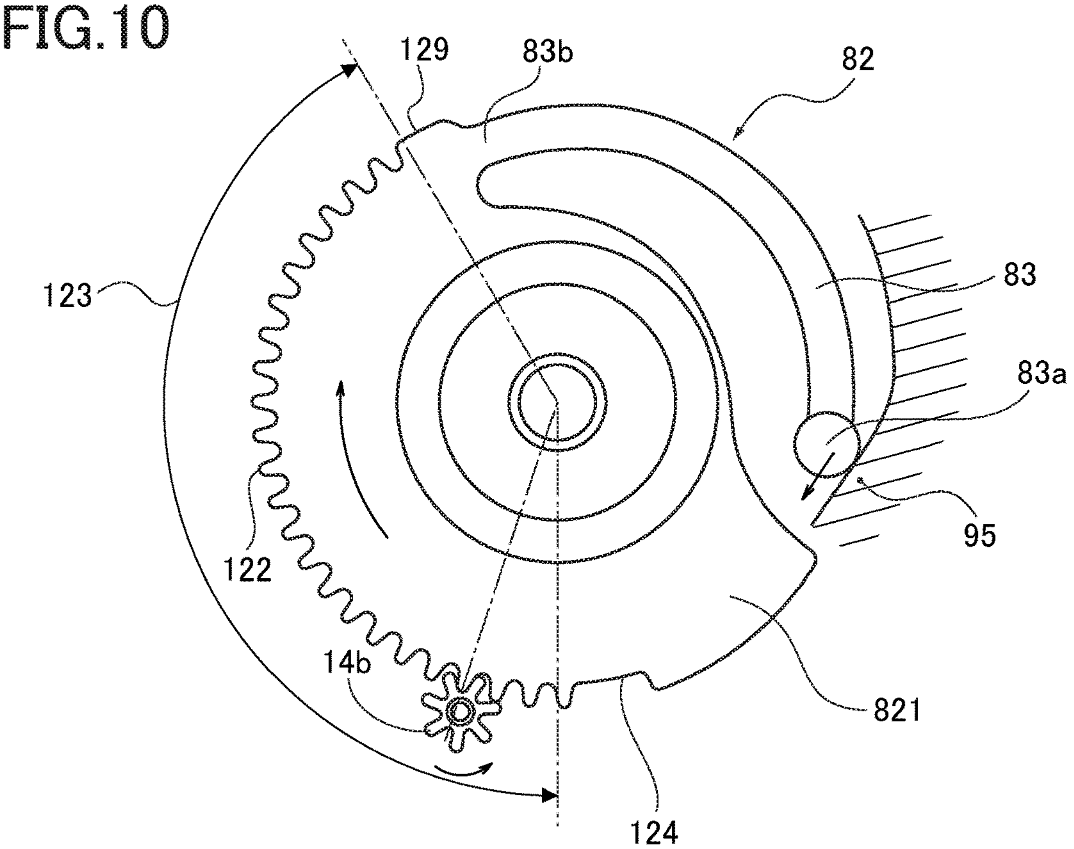
FIG. 10 is a view illustrating a hand driving wheel in a modified example, the view corresponding to FIG. 7.
Figure 11:
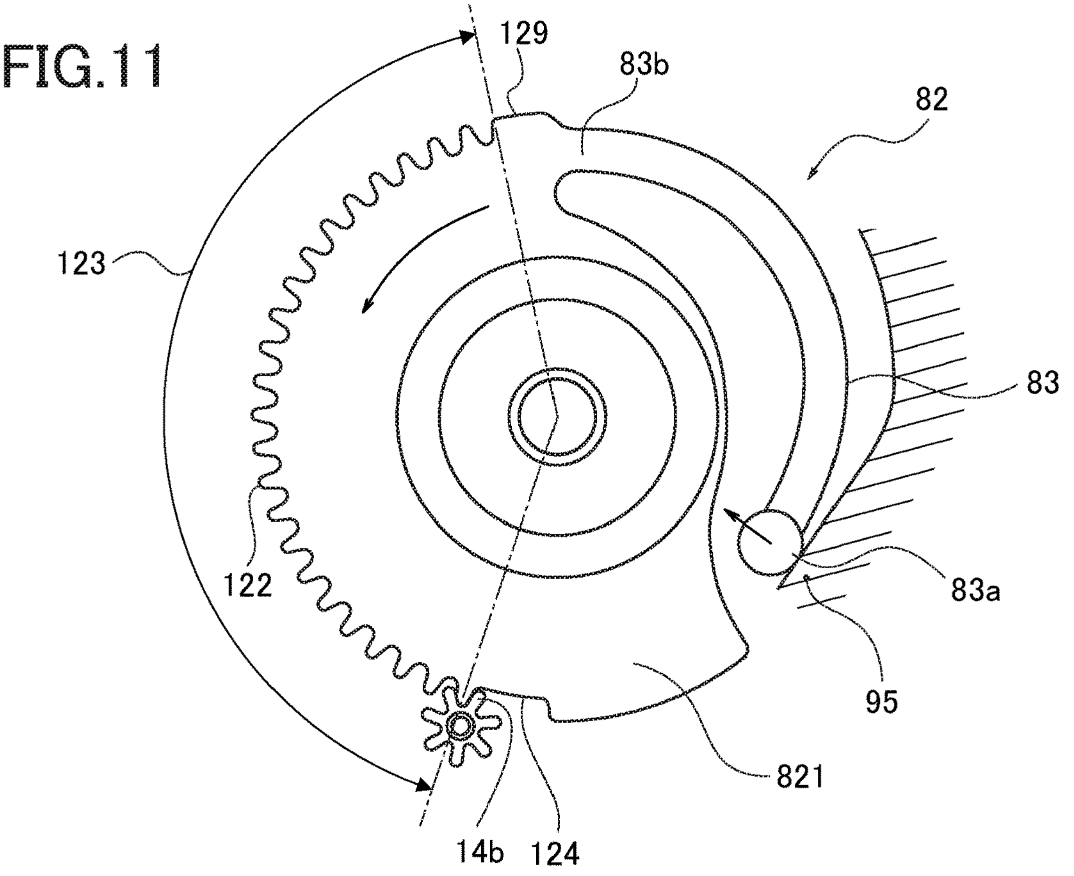
FIG. 11 is a view illustrating the hand driving wheel in the modified example, the view corresponding to FIG. 9.

FIGS. 10, 11 show that a part of a wheel 821 of a hand driving mechanism 82 is formed as a circular arc shaped elastic portion 83 (example of biasing member) extending in a circumference direction of the wheel 821.

Similar to the wheel 121 of the embodiment, the wheel 821 includes an angle area 123 provided with teeth 122, an idle region 124 adjacent to the angle area 123, and a stopper 129.

The circular arc shaped elastic portion 83 has one end as a fixed end 83*b* coupled to the stopper 129 and the other end as a free end 83*a* in front of the fixed end 83*b* in the clockwise direction. The free end 83*a* separates from a main body of the wheel 821 (a part of wheel 821 except elastic portion 83).

The free end 83*a* of the wheel 821 configured as described above starts contacting an inclined wall 95 formed in, for example, a ground plane of a movement in the state illustrated in FIG. 10, similar to the state illustrated in FIG. 7 in the embodiment.

Then, by the rotation of the pinion 14*b* in the counterclockwise direction, the wheel 821 further rotates in the clockwise direction, so that the free end 83*a* moves along the inclined wall 95 while contacting the inclined wall 95, and the free end 83*a* thereby moves toward an inside of the wheel 821 in the radial direction, as illustrated in FIG. 11. The elastic portion 83 bends with a curvature of the circular arc larger than that in the state in which the free end 83*a* does not contact the inclined wall 95, similar to the state in which the fixed end 83*b* is fixed.

Thereby, the wheel 821 receives the reaction force according to the bending of the elastic portion 83 from the fixed end 83*b*, and this becomes a torque rotating in the counterclockwise direction. In addition, FIG. 11 corresponds to the state illustrated in FIG. 8 in the embodiment.

With the fan-shaped display mechanism in the modified example as configured above, the operations and effects similar to those in the embodiment can be obtained, and the number of components can be reduced by integrating the hand driving wheel and the biasing member.

In the fan-shaped display mechanisms 10 of the above-described embodiment and modified example, the elastic member is adopted as the biasing member, and the kick spring is adapted as the elastic member. However, the elastic member is not limited to the kick spring, and another spring such as a coil spring and a plate spring can be adopted, or a rubber or the like which is an elastic material can be adopted.

The biasing member is a member that biases in one direction, and is not limited to the elastic member that presses in a predetermined direction by an elastic force or biases by pulling, for example, and may be a member that biases by pressing and pulling in a predetermined direction with a load except an elastic material.

The fan-shaped display mechanisms 10 of the above embodiment and the modified example can reciprocate the hand 11 in a circular arc shape within the fan-shaped area (area larger than fan-shaped display region 41 from state illustrated in FIG. 4 to state illustrated in FIG. 8) containing the fan-shaped display region 41 to display a predetermined physical amount. However, the reciprocating display mechanism of the present disclosure is not limited to the one that reciprocates the hand in a circular arc shape within the fan-shaped area.

Namely, the reciprocating display mechanism according to the present disclosure may be the one that linearly reciprocates the hand within a fixed rectangular area, or the one that reciprocates along a path of another shape.

In the fan-shaped display mechanisms 10 of the above-described embodiment and modified example, the area larger than the fan-shaped display region 41 is set as the "fixed area" within which the hand in the reciprocating display mechanism according to the present disclosure reciprocates. However, the fan-shaped display region 41 may be the "fixed area" in the present disclosure.

In the fan-shaped display mechanisms 10 of the above-described embodiment and modified example, the hand 11 and the hand driving wheel 12 are integrated. However, the hand 11 may be separated from the hand driving wheel 12 as long as it operates by the linkage with the movement of the hand driving wheel.

What is claimed is:

1. A reciprocating display mechanism that performs predetermined display by reciprocating a hand within a fixed area, the reciprocating display mechanism comprising:
- the hand capable of reciprocating within the fixed area;
- a hand-driving wheel that drives the hand and comprises a first wheel, the first wheel comprising a first surface extending generally along a radius of the first wheel, the hand-driving wheel comprising a projection extending from the first surface;
- a transmission wheel that rotates the hand-driving wheel by engaging with a tooth of the first wheel; and
- a biasing member that biases the hand in one direction via the projection at a predetermined rotational position of the hand-driving wheel, wherein
- the first wheel comprises an angle area corresponding to the fixed area and a region adjacent to the angle area, the angle area being provided with teeth and a part of the region adjacent to the angle area being provided with an idle region in which the transmission wheel idles, and
- the one direction that biases by the biasing member is a direction in which the tooth adjacent to the idle region engages with the transmission wheel when the idle region faces the transmission wheel.

2. The reciprocating display mechanism according to claim 1, wherein
- the biasing member is a kick spring separate from the hand-driving wheel that engages the projection at the predetermined rotational position at a surface of the kick spring to stop the projection from moving to inhibit rotation of the hand-driving wheel.

3. The reciprocating display mechanism according to claim 1, wherein the projection is positioned on the first surface within a radial perimeter of the first wheel.

4. The reciprocating display mechanism according to claim 1, wherein
- the biasing member is an elastic arm radially extending from a perimeter of the first wheel, and
- the elastic arm compresses to bias the hand when the projection engages an inclined wall to compresses the elastic arm toward the perimeter of the first wheel to inhibit rotation of the hand-driving wheel.

5. The reciprocating display mechanism according to claim 1, wherein
- the hand-driving wheel further comprises a second projection extending from the first surface, wherein the second projection extends from the first surface less than the projection extends from the first surface such that the second projection does not engage the biasing member.

6. The reciprocating display mechanism according to claim 1, wherein the biasing member is no more than a single biasing member.

7. A reciprocating display mechanism, comprising:

a hand capable of reciprocating within a fixed area;

a kick spring to provide a biasing force against one direction of motion of the hand;

a hand-driving wheel comprising a plurality of teeth provided along a contiguous portion of an edge of the hand-driving wheel, wherein an arc angle of the contiguous portion corresponds to a rotational minimum and a rotational maximum of the hand within the fixed area; and a transmission wheel that rotates the hand-driving wheel by engaging with the plurality of teeth, wherein, adjacent to a first end of the contiguous portion, the edge of the hand-driving wheel is provided without teeth to disengage the hand-driving wheel from the transmission wheel, and wherein, adjacent to a second end of the contiguous portion, the edge of the hand-driving wheel is provided with a stopper that stops rotation of the transmission wheel by contact, wherein the kick spring is separate from the hand-driving wheel, and wherein a surface of the kick spring engages a projection of the hand-driving wheel at a predetermined rotational position to stop the projection from moving to inhibit rotation of the hand-driving wheel.

8. A timepiece comprising:

the reciprocating display mechanism according to claim 7; and a stepping motor that rotates the hand-driving wheel, wherein the one direction is set in a direction corresponding to rotation in a direction opposite to a normal rotation direction of a rotor of the stepping motor.

9. The reciprocating display mechanism according to claim 7, wherein the kick spring is no more than a single kick spring.

* * * * *